Nov. 13, 1962   E. M. POOLE ETAL   3,063,926
METHOD OF OPERATING A NUCLEAR REACTOR
Filed Nov. 14, 1958
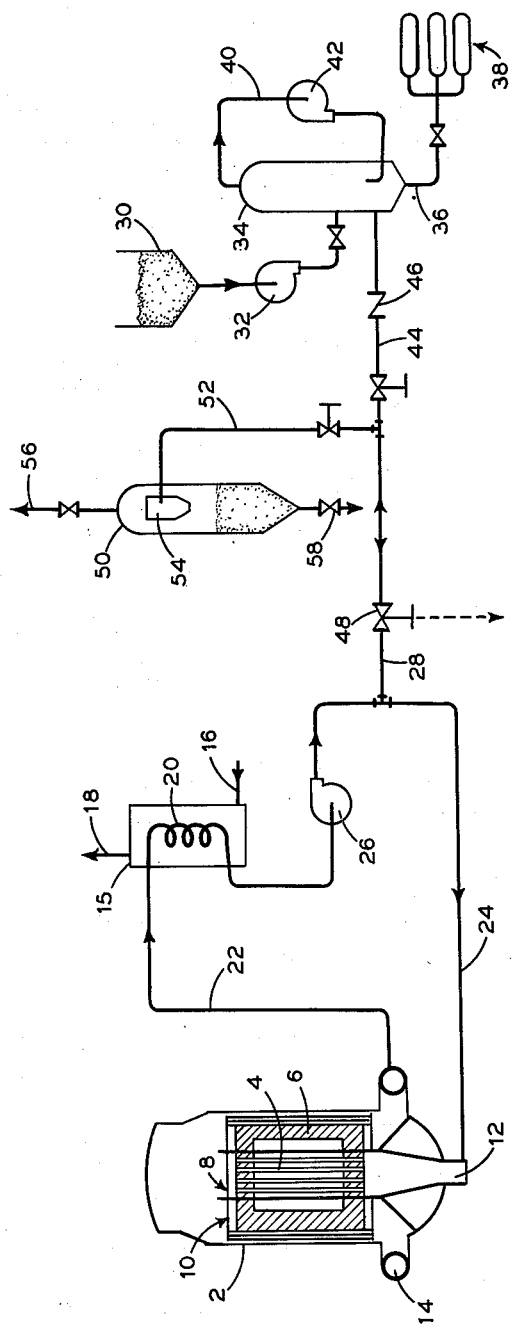
INVENTORS
Edward M. Poole
Donald C. Schluderberg
BY
ATTORNEY United States Patent Office 3,063,926
Patented Nov. 13, 1962

3,063,926
METHOD OF OPERATING A NUCLEAR REACTOR
Edward M. Poole, Alliance, Ohio, and Donald C. Schluderberg, Lynchburg, Va., assignors to The Babcock & Wilcox Company, New York, N.Y., a corporation of New Jersey
Filed Nov. 14, 1958, Ser. No. 773,974
14 Claims. (Cl. 204—193.2)

This invention relates in general to a nuclear reactor and, more particularly, to the system for cooling nuclear reactors.

In the United States all presently operating and most proposed power reactors are cooled by a liquid, either water or sodium. These two coolants have been selected because of their capability to absorb and transport large quantities of heat at high rates. Thus they allow the reactor to operate at high power densities. The use of these liquids, however, requires that metals in contact with them be resistant to corrosion. In all of the systems actually operating this means that the metals must be zirconium or high nickel alloys. Most of them use the austenitic stainless steel alloy having 18 percent chromium and 8 percent nickel. These materials are very expensive, difficult to fabricate and have poor thermal characteristics.

It is well known that the use of gas as a primary coolant for a nuclear reactor effectively eliminates much of the corrosion limitation on materials and allows the use of ordinary inexpensive carbon steel as the primary structural material of the reactor. The main drawback to the use of gas as a primary coolant is that it has a very low density and a low capacity for absorbing and transporting heat. Thus a power reactor cooled by gas would be charged with a very high parasitic loss due to the extremely high cost of pumping the gas coolant. This is generally regarded as such a large obstacle to the efficient production of power from atomic energy that there have been few serious proposals for the use of a gas coolant reactor in the United States.

There has been proposed that a nuclear reactor be operated as a fluidized mass of fissile material in which the fluidizing gas transports the heat from the reactor. In this system the reactor is geometrically shaped so that when a given density of fissile material is maintained in a fluid state in the reactor, a nuclear chain reaction will occur. The bed is maintained fluidized by the passing of a gas through the mass at relatively low velocities which are high enough however to buoy up the individual particles. The fluidized mass is maintained as a stationary seething mass of particles with the gas leaving the bed through a gas-solid separation device and passing back through a heat exchanger into the bed for further fluidization. This technique is well known in the petroleum industry where it was originally developed as a means for catalyzing hydrocarbon processes and is illustrated in a book "Fluidization" by D. F. Othmer, published 1956 by Reinhold Publication Corporation, New York. The fluidized bed technique requires that the particles have a major dimension of greater than about 50 microns and that the gas pass through the bed at velocities generally less than ten feet per second. This system promotes the transfer of heat by the random motion of the particles through the gas to thus effectively effect the heat transfer rate. It is limited, however, by the fact that the gas has a low density and velocity so that the amount of heat which may be transferred from the fluidized bed is rather low.

The present invention provides a method of cooling a nuclear reactor and transporting the heat to a remote energy converter by passing in heat transfer relationship with the heterogeneously arranged fissioning material within the reactor, a fluidized mass of finely divided solids carried in the gas stream in which the proportion of solids to gas are at least ten to one on a weight basis.

The invention further provides that the heated fluidized stream from the reactor be passed into an energy consuming device, such as a heat exchanger for the ultimate passage of the heat to a prime mover.

Additionally, the invention contemplates the continuous fluidization of the finely divided solids in a closed circulating flow path between the heat exchanger and the reactor for the continuous transport of heat energy.

Also, the invention provides a mixture of finely divided solids consisting of a low neutron absorbing solid and bentonite clay where the clay promotes effective fluidization.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which specific embodiments of the invention are illustrated and described.

The drawing is a schematic diagram of a system utilizing the present invention. The nuclear reactor 2 is arranged with a sufficient quantity of fissile material 4 in the form of distinct or heterogeneous fuel elements along with a proper moderator surrounded by reflector 6 to sustain a nuclear chain reaction. The reactor is divided into two passes, a central pass 8 in which the coolant flows upwardly and an annular passage 10 in which the coolant flows downwardly. There is a central inlet 12 and a toroidal outlet header 14 connected in series with the passes 8 and 10 for the flow of coolant through the reactor. Remote from the reactor there is located a heat energy consumer, such as a heat exchanger 15. The heat energy consumer or heat exchanger is arranged to be cooled by boiling water in which the feed liquid enters from line 16 and steam leaves from the line 18. Within the consumer there is a heat exchange surface 20 which is connected in series with lines 22, 24 to complete a closed flow path through the reactor 2 and heat exchanger 15. A pump 26 is arranged on the discharge side of the heat exchanger to continuously circulate the coolant.

Within the reactor and heat exchanger the fluidized mass is preferably whirled by spinners of a well known type to promote the rapid mass transfer of the solid particles and thus promote heat transfer. This fluid may be effectively whirled by helical spinners having a pitch to diameter ratio of 6 to 18.

The present invention contemplates a reactor coolant consisting of finely divided low neutron absorbing solids having a major dimension of less than 10 microns and being mixed with a low neutron absorbing gas in the proportion of greater than 10 pounds of solids per pound of gas. Such a mixture, if maintained at a velocity of 10 feet per second, will act as a fluid and the solids will not settle out.

This coolant is introduced by the line 28 into the reactor coolant line 24 wherein it is constantly circulated by the pump 26. The solids are supplied to a tank 30 and are pumped by the pump 32 through a valved line into a fluidizing tank 34. Into the bottom of the tank 34 there is admitted a quantity of low neutron absorbing gas by the line 36 from the storage system 38. A fluidizing gas circuit 40 with a pump 42 is arranged so that gas is constantly pumped out of the top of the fluidizing tank 34 and into the bottom where a constant fluidized turbulent mass of the solids is maintained at a pressure slightly higher than that in the primary coolant line 24. A pipe 44 having a check valve 46 is arranged to draw fluidized solids from the tank 34 and discharge it into the supply line 28 through a control valve 48. The control valve is arranged to be operated in response to the temperature conditions existing in the primary coolant system as more completely described hereinafter. The line 28 and the valve 48 are arranged so that the flow of fluidized solids may be either in or out of the primary coolant system to maintain a predetermined condition within the system. Therefore, a solids collecting tank 50 is arranged to be supplied solids by the valve controlled line 52 and in the interior of the tank where the terminal end of the line 52 is a solids-gas separator 54. The gases leave the top of the collector through a valve control line 56 where they may be purified of the gaseous fission products or other radioactive gases and the solids are collected in the bottom of the tank 50 where they may be individually discharged through the valve control line 58 to any convenient purifying system.

The low neutron absorbing finely divided solids useful in the present system may be any one of the group consisting of the oxides and carbides of aluminum, beryllium, and zirconium and solid carbon in its various forms, such as graphite, lamp black, and charcoal. These materials are generally considered to be the principal solids useful in reactor systems which have a low neutron absorbing capacity. Some of them are capable of acting as moderator when maintained at sufficient density. These solids are arranged such that their major dimension is less than 10 micron i.e. a finely divided dust.

The gases which may be advantageously used with these solids are the low neutron absorbing gases from the group consisting of carbon dioxide and monoxide, hydrogen, helium, argon. When any of these gases are mixed with any of the above mentioned solids in a proportion of at least 10 pounds of solids per pound of gas there results a very dense mixture in which the solids are fluidized when the gas flows at a rate of greater than 10 feet per second.

It was found that continuous fluidization is improved by the addition of bentonite clay (an impure aluminum silicate clay of the Western states) to the finely divided solids. Such clay may be effectively used in the range of 10 to 2 percent by weight of the total solids mixture. Preferably the clay is added as five percent of the total weight of the solids. Such clay being sized to pass 95 percent through a 325 mesh (44 microns) screen and having the following chemical typical analysis: by weight percentage

| | |
|---|---|
| $SiO_2$ | 62.43 |
| $Al_2O_3$ | 24.64 |
| $Fe_2O_3$ | 3.70 |
| CaO | 0.41 |
| MgO | 2.30 |
| $K_2O$ | 0.15 |
| $Na_2O$ | 0.60 |
| Ignition loss | 6.12 |

The mixture results in a fluid heat transfer medium which has a high specific heat and density and yet is capable of being pumped and flowed as a fluid. Further the mixture is capable of transporting extremely large quantities of heat economically and gives heat transfer rates above 500 B.t.u.'s per hour per degree Fahrenheit per square foot of heat transfer surface. Most importantly, this mixture has the corrosion characteristics of the gas and permits operation with most grade materials such as carbon steel. Moreover, as a mixture subject to temperature it is extremely stable even at a temperature in the order of 2,000° F.

Accordingly, this mixture when applied to the illustrated system would be injected into the primary coolant line 24. The pump 26 will then circulate the medium through the two passes of the nuclear reactor and the heat exchanger 15. The reactor would be constructed generally in accordance with the teaching in the patent to Fermi et al. 2,708.656 and more particularly, may be of the type shown in the patent to Metcalf et al. 2,741,593.

As described in these patents, the reactor may be conventionally controlled to give a sustaining chain reaction and the temperatures would then be maintained at a predetermined level by the flow of the mixture of finely divided solids and gas therethrough at a velocity greater than 10 feet per second. The primary coolant system may have its density either increased or decreased by the loading and unloading through the line 28 according to a predetermined condition. For instance, it is possible to maintain the temperature conditions at the inlet and outlet of both the reactor and the heat exchanger by varying the density of the gas solid mixture in proportion to the heat load of the reactor. Thus the control valve 48 would be connected to the reactor control system so that when the reactor reduced load, some of the solids in the primary coolant system would be removed to lighten the density. Thus for every unit volume of mixture pumped around the primary coolant system by the pump 26 there would result a smaller quantity of heat carried at the same temperature. The valves in the new gas and solids system and in the solids collection system would be arranged to connect to the control for the valve 48 so that they will open and close in proportion to the proper signal.

As an example of the effectiveness of this coolant, in a recent successful experiment a film coefficient of 256 B.t.u./ft.$^2$—° F. was obtained in a .824″ I.D. steam heated section. This corresponds to a coefficient of approximately 750 at film temperatures expected in a reactor core. The test was run with carbon dioxide fluidizing a 19 to 1 mixture of graphite (10 microns and less) and bentonite having a density of approximately 5 lb./cu. ft. (24 lbs. solid/lb. gas). Pump inlet and outlet pressures were 25 and 40 p.s.i.g., respectively. Mixture flow rate corresponding to the above coefficient was approximately 50 lb./min. (35 ft./sec.). The film temperature of the suspension was approximately 250° F.

The realization of improved heat capacity requires the use of particles below 10 microns in size to eliminate large temperature differences between particles and gas. It is also necessary to have the proper conditions of velocity and mass transfer to prevent large radial temperature differences in the flowing suspension stream. This mass transfer is promoted by the whirling motion which is given to the fluidized stream. It has been found that without the whirling motion the heat transfer coefficient is materially less.

In addition to the desirable characteristics mentioned above, gas suspensions possess a unique ability to trap fission products. This property would be of considerable value in a high temperature reactor system since fission product leakage through fuel element coating or cladding tends to increase with temperature.

A typical reactor system using a solid-gas mixture would deliver 500 M.W. of heat in the form of 1500 p.s.i. steam at a rate of 1,620,000 lbs. per hour. The reference reactor is a thorium converter cooled by graphite suspension in carbon dioxide gas flowing in a closed cooling system as hereinbefore described. Boilers supply steam to a conventional turbo-generator system. The principal properties of the carbon dioxide-solid coolant for this specific design is 30 pounds of solids per pound of gas yielding a density of 22.5 lbs. per cu. ft. with a specific heat of 0.38 B.t.u.'s per lb. degree Fahrenheit at 900 degrees F. and 280 p.s.i.g.

Graphite-gas coolant enters the reactor 2 at 312 p.s.i.g. and 800 F. and leaves at 246 p.s.i.g. for 1000 F. The circulating pump 26 circulates this fluid with these temperatures entering and leaving the heat exchanger 15, with a pressure drop in the system of 74 p.s.i.

The reactor is arranged with a core 15 ft. in diameter plus a reflector 6 inside of a 22 ft. diameter pressure vessel. Control rods may penetrate the head of the vessel at the bottom as designated by the design selection. The core has 10,000 cooling passages approximately 15 ft. long yielding a heat transfer surface of 19,750 sq. ft.

and is designed to maintain an average heat flux of 86,500 B.t.u.'s per hour per square foot. The fuel elements contain 25 percent enriched U-235 as oxide mixed with thorium oxide. Both the moderator and reflector are graphite. The initial loading of the reactor is 396 kilograms of U-235 and 14,820 kilograms of thorium giving an initial excess reactivity of .25.

The cooling of a nuclear reactor by a mixture of gas and carefully sized solids flowing at substantial velocities through the reactor and transporting the heat to a remote heat exchanger yields a reactor system having the low corrosion characteristics of a gas cooled reactor while yielding the high thermal performance of a liquid cooled reactor. Such an arrangement is practically unlimited as to the opportunity for the generation of power at sustained temperatures yielding good thermal cycle performance and opening a whole new avenue of reactor development. It is important to note that the system proposed requires the flow of a dense gas solid mixture at substantial velocities whereby the heat transfer rate to the fluid is very high and the thermal transport capacity is high.

The solids used in the gas-solids coolant mixture are carefully sized and prepared to give optimum coolant performance. After several hours of circulation in a coolant system, these particles become transformed into very fine particles. In some of the experimental work previously mentioned, the graphite charged into the system was found to have a surface area of 11.8 m.$^2$/g. The surface area of the finely divided solids was found to reach an equilibrium value of approximately 270 m.$^2$/g.

While in accordance with the provisions of the statutes, we have illustrated and described herein a specific form of the invention now known to us, those skilled in the art will understand that changes may be made in the form of the apparatus disclosed without departing from the spirit of the invention covered by our claims, and that certain features of the invention may sometimes be used to advantage without a corresponding use of the other features.

What is claimed is:

1. An improved heat transfer fluid comprising finely divided solids consisting of a low neutron absorbing material selected from the group consisting of carbon and the oxides and carbides of aluminum, beryllium and zirconium with said solids having an as-loaded major dimension of less than ten microns, said solids being fluidized by a low neutron absorbing gas selected from the group consisting of carbon monoxide, carbon dioxide, hydrogen, helium, nitrogen and argon.

2. In a nuclear reactor, an improved heat transfer fluid comprising a mixture of finely divided solids consisting of 90 to 98 percent by weight of a low neutron absorbing material selected from the group consisting of carbon and the oxides, carbides of aluminum, beryllium and zirconium, and 10 to 2 percent by weight of bentonite clay, said mixture being fluidized by a low neutron absorbing gas selected from the group consisting of carbon monoxide, carbon dioxide, hydrogen, helium, nitrogen and argon.

3. In a nuclear reactor, an improved heat transfer fluid comprising a mixture of finely divided solids consisting of 90 to 98 percent by weight of a low neutron absorbing material selected from the group consisting of carbon and the oxides and carbides of aluminum, beryllium and zirconium, such solids having an as loaded major dimension less than ten microns, and 10 to 2 percent by weight of bentonite clay having an as loaded major dimension of less than 44 microns, said mixture being fluidized by a low neutron absorbing gas selected from the group consisting of carbon monoxide, carbon dioxide, hydrogen, helium, nitrogen and argon.

4. In a nuclear reactor, an improved heat transfer fluid comprising a mixture of finely divided solids consisting of approximately 95 percent by weight of a low neutron absorbing material selected from the group consisting of carbon and the oxides and carbides of aluminum, beryllium and zirconium, such solids having an as loaded major dimension less than ten microns, and approximately 5 percent by weight of bentonite clay having an as loaded major dimension of less than 44 microns, said mixture being fluidized by a low neutron absorbing gas selected from the group consisting of carbon monoxide, carbon dioxide, hydrogen, helium, nitrogen and argon.

5. An improved heat transfer fluid comprising finely divided solids consisting of a low neutron absorbing material selected from the group consisting of carbon and the oxides and carbides of aluminum, beryllium and zirconium with said solids having an as-loaded major dimension of less than ten microns, said solid being fluidized by a low neutron absorbing gas selected from the group consisting of carbon monoxide, carbon dioxide, hydrogen, helium, nitrogen and argon in proportions of greater than ten pounds of solids per pound of gas.

6. In a heat transfer system having a heat emitting zone and a heat energy conversion zone remote from said heat emitting zone, the improved method comprising fluidizing a mixture of finely divided solids consisting of a low neutron absorbing material selected from the group consisting of carbon and the oxides and carbides of aluminum, beryllium and zirconium, plus carbon with said solids having an as-loaded major dimension of less than ten microns, said mixture being fluidized by a low neutron absorbing gas selected from the group consisting of carbon monoxide, carbon dioxide, hydrogen, helium, nitrogen and argon, and passing said fluidized solids in a continuously recirculated stream through said heat emitting zone and heat energy conversion zone.

7. In a nuclear reactor system having a chain reacting zone arranged to release heat from the fission of fissionable material arranged in distinct form within a core and a heat energy conversion zone remote from said chain reacting zone, the improved method comprising fluidizing a mixture of finely divided solids consisting of 90 to 98 percent by weight of a low neutron absorbing material selected from the group consisting of carbon and the oxides and carbides of aluminum, beryllium and zirconium, and 10 to 2 percent by weight of bentonite clay, said mixture being fluidized by a low neutron absorbing gas selected from the group consisting of carbon monoxide, carbon dioxide, hydrogen, helium, nitrogen and argon, and passing said fluidized solids in a continuously recirculated stream through said chain reacting zone and heat energy conversion zone.

8. In a nuclear reactor system having a chain reacting zone arranged to release heat from the fission of fissionable material arranged in distinct form with a core and a heat energy conversion zone remote from said chain reacting zone, the improved method comprising fluidizing a mixture of finely divided solids consisting of 90 to 98 percent by weight of a low neutron absorbing material selected from the group consisting of carbon and the oxides and carbides of aluminum, beryllium and zirconium, and 10 to 2 percent by weight of bentonite clay, said mixture being fluidized by a low neutron absorbing gas selected from the group consisting of carbon monoxide, carbon dioxide, hydrogen, helium, nitrogen and argon, passing said fluidized solids in a continuously recirculated stream through said chain reacting zone and heat energy conversion zone, and whirling said stream of fluidized solids at a pitch to diameter ratio of 6 to 18.

9. In a nuclear reactor system having a chain reacting zone arranged to release heat from the fission of fissionable material arranged in distinct form within a core and a heat energy conversion zone remote from said chain reacting zone, the improved method comprising fluidizing a mixture of finely divided solids consisting of 90 to 98 percent by weight of a low neutron absorbing material selected from the group consisting of carbon and the oxides and carbides of aluminum, beryllium and zirconium, and 10 to 2 percent by weight of bentonite clay, said mixture being fluidized by a low neutron absorbing gas selected from the group consisting of carbon monoxide, carbon dioxide, hydrogen, helium, nitrogen and argon, passing said fluidized solids in a continuously recirculated stream through said chain reacting zone and heat energy conversion zone, whirling said stream of fluidized solids at a pitch to diameter ratio of 6 to 18 and varying the density of the solids in the gas to control the temperature conditions in the two zones.

10. In a nuclear reactor system having a chain reacting zone arranged to release heat from the fission of fissionable material arranged in distinct form within a core and a heat energy conversion zone remote from said chain reacting zone, the improved method comprising fluidizing a mixture of finely divided solids consisting of 90 to 98 percent by weight of a low neutron absorbing material selected from the group consisting of carbon and the oxides and carbides of aluminum, beryllium and zirconium, such solids having an as loaded major dimension less than ten mircrons, and 10 to 2 percent by weight of bentonite clay having an as loaded major dimension of less than 44 microns, said mixture being fluidized by a low neutron absorbing gas selected from the group consisting of carbon monoxide, carbon dioxide, hydrogen, helium, nitrogen and argon, and passing said fluidized solids in a continuously recirculated stream through said chain reacting zone and heat energy conversion zone.

11. In a nuclear reactor system having a chain reacting zone arranged to release heat from the fission of fissionable material arranged in distinct form within a core and a heat energy conversion zone remote from said chain reacting zone, the improved method comprising fluidizing a mixture of finely divided solids consisting of 90 to 98 percent by weight of a low neutron absorbing material selected from the group consisting of carbon and the oxides and carbides of aluminum, beryllium and zirconium, such solids having an as loaded major dimension less than ten microns, and 10 to 2 percent by weight of bentonite clay having an as loaded major dimension of less than 44 microns, said mixture being fluidized by a low neutron absorbing gas selected from the group consisting of carbon monoxide, carbon dioxide, hydrogen, helium, nitrogen and argon, passing said fluidized solids in a continuously recirculated stream through said chain reacting zone and heat energy conversion zone and whirling said stream of fluidized solids at a pitch to diameter ratio of 6 to18.

12. In a nuclear reactor system having a chain reacting zone arranged to release heat from the fission of fissionable material arranged in distinct form within a core and a heat-energy conversion zone remote from said chain reacting zone, the improved method comprising fluidizing a mixture of finely divided solids consisting of 90 to 98 percent by weight of a low neutron absorbing material selected from the group consisting of carbon and the oxides and carbides of aluminum, beryllium and zirconium, such solids having an as loaded major dimension less than ten microns, and10 to 2 percent by weight of bentonite clay having an as loaded major dimension of less than 44 microns, said mixture being fluidized by a low neutron absorbing gas selected from the group consisting of carbon monoxide, carbon dioxide, hydrogen, helium, nitrogen and argon, passing said fluidized solids in a continuously recirculated stream through said chain reacting zone and heat energy conversion zone, whirling said stream of fluidized solids at a pitch to diameter ratio of 6 to 18, and varying the density of the solids in the gas to control the temperature conditions in the two zones.

13. In a nuclear reactor system having a chain reacting zone arranged to release heat from the fission of fissionable material arranged is distinct form within a core and a heat energy conversion zone remote from said chain reacting zone, the improved method comprising fluidizing a mixture of finely divided solids consisting of 90 to 98 percent by weight of a low neutron absorbing material selected from the group consisting of carbon and the oxides and carbides of aluminum, beryllium and zirconium, such solids having an as loaded major dimension less than ten microns, and 10 to 2 percent by weight of bentonite clay having an as loaded major dimension of less than 44 microns, said mixture being fluidized by a low neutron absorbing gas selected from the group consisting of carbon monoxide, carbon dioxide, hydrogen, helium, nitrogen and argon in proportions of greater than ten pounds of solids per pound of gas, and passing said fluidized solids in a continuously recirculated stream through said chain reacting zone and heat energy conversion zone at a velocity greater than fifteen feet per second.

14. In a nuclear reactor system having a chain reacting zone arranged to release heat from the fission of fissionable material arranged in distinct form within a core and a heat energy conversion zone remote from said chain reacting zone, the improved method comprising fluidizing a mixture of finely divided solids consisting of approximately 95 percent by weight of a low neutron absorbing material selected from the group consisting of carbon and the oxides and carbides of aluminum, beryllium and zirconium, such solids having an as loaded major dimension less than ten microns, approximately 5 percent by weight of bentonite clay having an as loaded major dimension of less than 44 microns, said mixture being fluidized by a low neutron absorbing gas selected from the group consisting of carbon monoxide, carbon dioxide, hydrogen, helium, nitrogen and argon in proportions of greater than ten pounds of solids per pound of gas, passing said fluidized solids in a continuously recirculated stream through said chain reacting zone and heat energy conversion zone at a velocity greater than fifteen feet per second, and whirling said stream of fluidized solids at a pitch to diameter ratio in the range of 6 to 18.

References Cited in the file of this patent

UNITED STATES PATENTS

| 2,459,836 | Murphree | Jan. 25, 1949 |

FOREIGN PATENTS

| 749,064 | Great Britain | May 16, 1956 |
| 792,114 | Great Britain | Mar. 19, 1958 |

OTHER REFERENCES

Othmer: Fluidization, Reinhold Publishing Co., N.Y. 1956, pages 23–53.

Chemical and Eng. News., vol. 36, No. 42, Oct. 20, 1958, pages 54 and 56.